May 27, 1952     R. E. J. NORDQUIST     2,597,893
APPARATUS FOR APPLYING A COATING BAND TO MOVING ARTICLES
Filed Dec. 30, 1947     2 SHEETS—SHEET 1

TO SOURCE OF
INERT GAS
UNDER PRESSURE

INVENTOR
Ronald E. J. Nordquist
BY Ivan D. Thornburgh
Charles H. Orne
ATTORNEYS

May 27, 1952  R. E. J. NORDQUIST  2,597,893
APPARATUS FOR APPLYING A COATING BAND TO MOVING ARTICLES
Filed Dec. 30, 1947  2 SHEETS—SHEET 2

INVENTOR
Ronald E. J. Nordquist
BY Ivan D. Thornburgh
Charles H. Erne
ATTORNEYS

Patented May 27, 1952

2,597,893

UNITED STATES PATENT OFFICE 2,597,893

APPARATUS FOR APPLYING A COATING BAND TO MOVING ARTICLES

Ronald E. J. Nordquist, Maplewood, N. J., assignor to American Can Company, New York, N. Y., a corporation of New Jersey Application December 30, 1947, Serial No. 794,695

6 Claims. (Cl. 113—62)

The present invention relates to a method of an apparatus for soldering or otherwise coating a predetermined area of container or can bodies or other articles and has particular reference to ejecting and laying a controlled or measured amount of molten solder or other coating material onto the seams or other area to provide a solder bond between the seam parts or a coating for the predetermined area.

An object of the invention is the provision of a method of and apparatus for soldering seams or coating predetermined areas in articles wherein molten solder or other coating material may be applied in a narrow band in the exact place and amount needed for bonding the seam parts together or for coating the predetermined area without leaving excess material which must be subsequently wiped off. In the case of can bodies the elimination of the wiping operation by the present invention prevents contamination of their interior surfaces by loose pellets of the coating material usually thrown off by the wiper devices.

Another object is the provision of such a method and apparatus wherein different amounts or thicknesses of solder or other coating material may be deposited at different places on the area to be soldered or coated so that increased strength of bond or increased thickness of material may be had along the area to be soldered or coated.

Another object is the provision of such a method and apparatus wherein a predetermined minimum quantity of solder or other coating material is applied to the area to be soldered or coated in such a manner as to induce capillary attraction of the solder or coating material throughout the area to produce a desired bonding of the parts or a full covering of the area without waste of solder or coating material.

Another object is the provision of such a method and apparatus wherein the molten solder or coating material is maintained in close confinement so that oxidation or other deterioration of the solder or coating material is prevented even while being applied to the part to be coated. This tends to retain the molten solder or other coating material in a pure condition.

Another object is the provision of such a method and apparatus wherein simplicity in the steps and in the construction and operation of the apparatus is highly desirable for high speed continuous production, such as where articles travel through a machine in a rapid and continuous procession in spaced and timed order.

Numerous other objects and advantages of the invention will be apparent as it is better understood from the following description, which, taken in connection with the accompanying drawings, discloses a preferred embodiment thereof.

Referring to the drawings.

Figure 2:
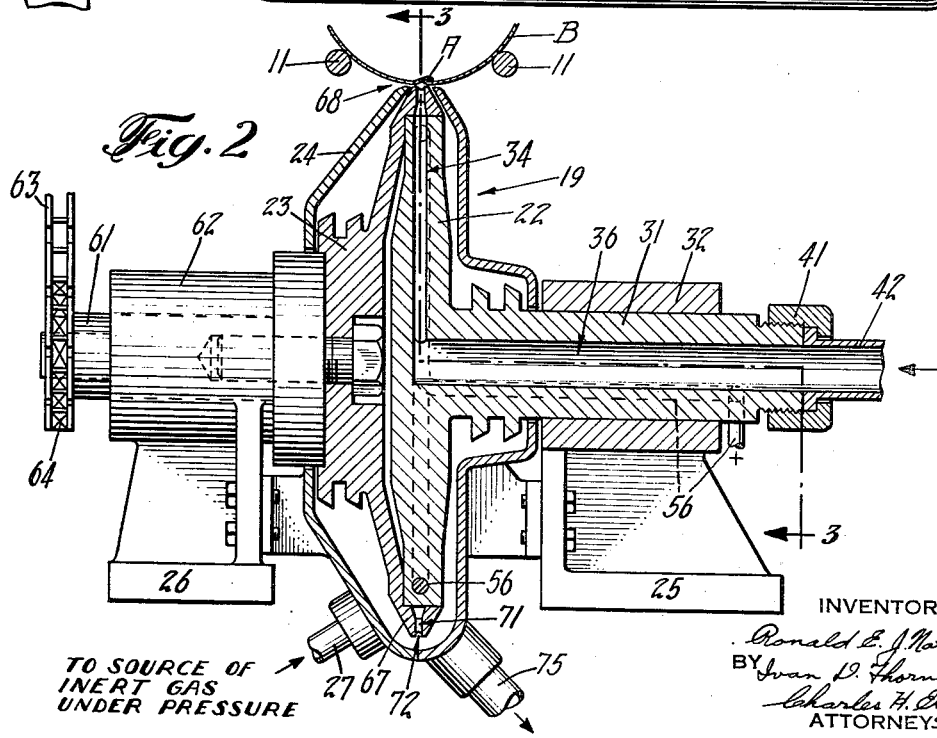
Fig. 2 is an enlarged sectional view taken substantially along the broken line 2—2 in Fig. 1, with parts broken away, a portion of a can body with side seam being shown in solder receiving position.
Figure 3:
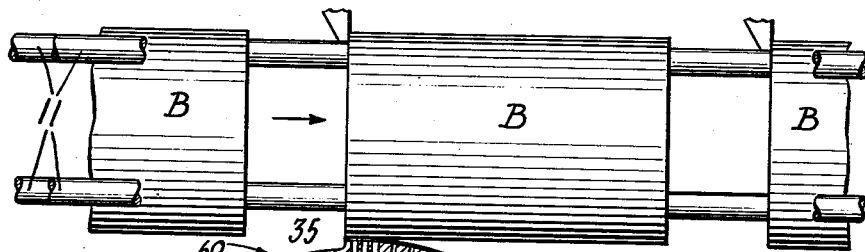
Figure 3:
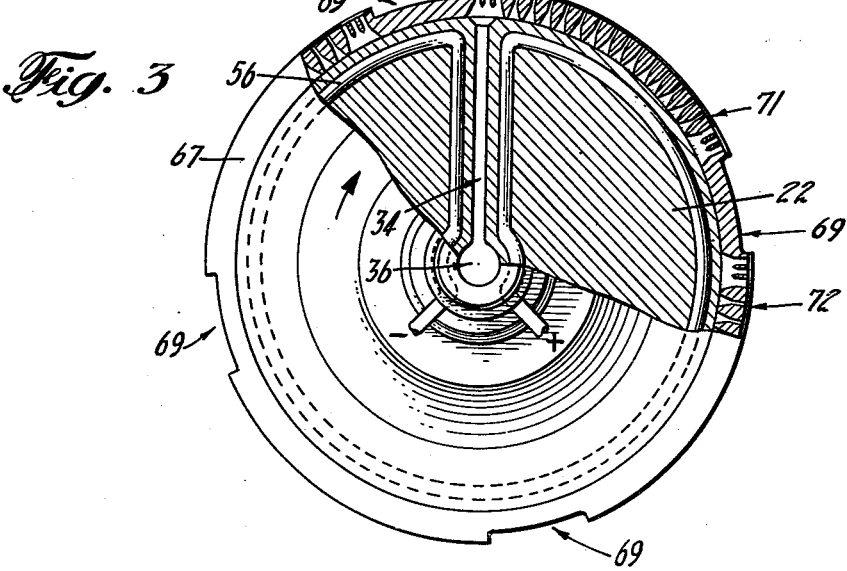
Figure 4:
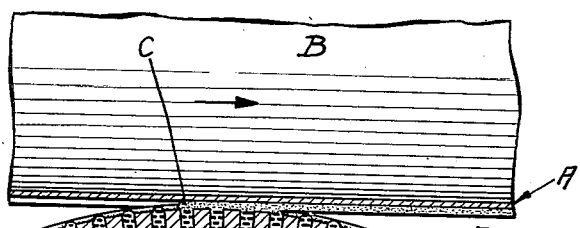
Figure 5:
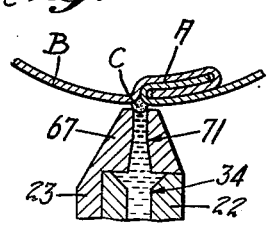

Fig. 3 is a part elevation, part sectional view taken substantially along the broken line 3—3 in Fig. 2, with parts omitted and parts broken away and with can bodies shown in place; and Figs. 4 and 5 are respectively enlarged longitudinal and transverse sections of a cam body and the adjacent portion of the apparatus showing in detail how molten solder or other coating material is applied to the seam of the body.

As a preferred embodiment and exemplified application of the instant invention the drawings illustrate principal parts of an apparatus and steps of a method of soldering interlocked portions of side seams A (Figs. 2 and 5) of tubular sheet metal can bodies B moving along a straight line path of travel in a continuous procession in spaced and timed order, although the invention is equally well adapted to soldering or otherwise coating other types of seams or areas in many other kinds of articles.

In the method steps of the invention the side seam A of a moving can body B is enveloped during the soldering operation in an atmosphere of an inert, noncombustible gas, such as nitrogen so that the solder which is in a molten condition will be prevented from oxidizing. This retains the solder in a pure condition. While the seam is thus enveloped in this atmosphere, molten solder under a desired pressure, which may be varied to suit conditions, is formed into small measured portions, globules or pellets C and are laid or gently ejected onto the seam A of a container body C as best shown in Figs. 4 and 5 for bonding the seam parts together. The globules C of solder may be deposited onto the seam individually and in succession in spaced order in a straight line procession, or as when they are closely spaced so that they flow together, may be applied in an undulated wire form and thereby produce a continuous soldered area or band along the seam of just sufficient width to properly bond together the seam parts without any excess solder which requires subsequent removal by wiping or otherwise. Capillary attraction draws the solder into the seam in the usual manner.

Figure 1:
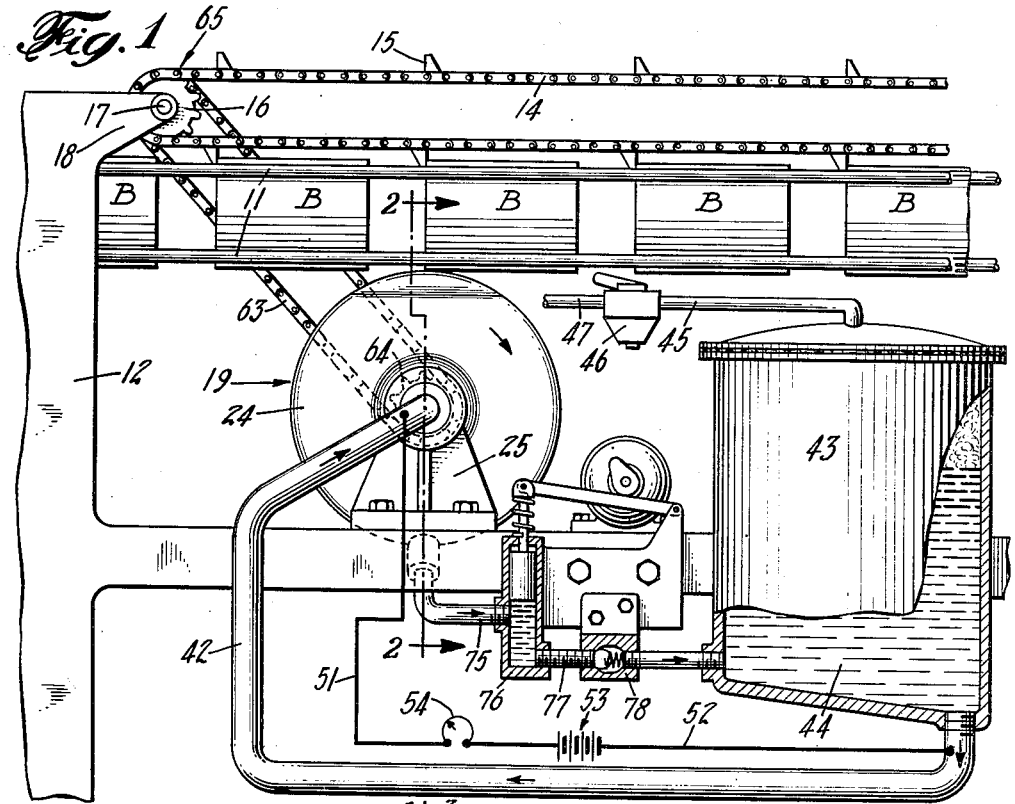
Figure 1 is a side elevation of an apparatus embodying and for carrying out the method steps of the instant invention, parts being broken away and parts being shown in section, and can bodies being shown in travelling position.

In the apparatus, the can bodies B are supported in a horizontal, spaced end-to-end position with their side seams A in solder receiving alignment at the bottoms of the bodies. The bodies are supported by a stationary outside horn or mandrel which comprises a plurality of longitudinal horn bars 11 (Figs. 1, 2 and 3) secured in a frame 12 which constitutes the main frame of the apparatus. The supported bodies are propelled along the horn bars 11 in a continuous procession in timed and spaced order by an endless chain conveyor 14 having feed dogs 15 secured thereto at spaced intervals for engagement behind the bodies as shown in Fig. 1. The conveyor 14 operates over and is driven by a sprocket 16 mounted on a driving shaft 17 carried in bearing brackets 18 formed on the main frame 12. The driving shaft may be rotated in any suitable manner.

Soldering of the side seams A of the can bodies B is effected while the bodies are moving along the horn bars 11 and as they pass a soldering device 19 (Figs. 1 and 2) disposed adjacent the path of travel of the bodies. This soldering device 19 comprises a stationary solder conveying element 22 and a movable solder applying element 23, both of which are located in a casing 24 secured to a pair of brackets 25, 26 bolted to the main frame 12. This casing is preferably filled with an inert, non-combustible gas, such as nitrogen for maintaining an air free atmosphere to prevent oxidation of the solder and to thereby keep it pure and free from dross. This gas is introduced into the casing through an inlet pipe 27 which is secured in the bottom of the casing. The pipe leads from any suitable source of supply of the gas. The casing forms part of a closed system or confined space for the solder to maintain the solder free of dross as mentioned above.

The stationary element 22 of the soldering device 19 preferably is a vertically disposed disc formed on a horizontal stem 31 (see Fig. 2) secured in a bearing 32 in the bracket 25. The disc is located in alignment with the path of travel of the side seams of the moving can bodies and its periphery is disposed in spaced relation thereto. The disc is formed with a vertical feed channel 34 which is open at the periphery of the disc adjacent the path of travel of the bodies. This end of the channel is counterbored to form a slightly elongated delivery recess 35 (see Fig. 4). The channel 34 terminates at the geometric center of the disc and here communicates with a large diameter feed channel 36 formed in the stem 31 and extending from the channel 34 to the outer end of the stem.

Molten solder under pressure is fed through these channels 34, 36 and for this purpose the outer end of the stem 31 is connected by a nut 41 (Fig. 2) to one end of a supply pipe 42. The opposite end of the supply pipe is connected into the bottom of a closed solder supply tank 43 (see Fig. 1) secured to the main frame 12. This tank contains a supply of molten solder 44 which is maintained in a molten condition by heating it in any suitable manner.

Referring to Fig. 4, it will be observed that the tops of many of the columns of solder in the outlets are convex. This convexity changes to globule form as each outlet registers with recess 35 of the feed channel 34. Each globule would therefore form between the positions of outlet 71 at the left (Fig. 4) of the recess 35 and the next outlet to the right on which a globule C is indicated as in contact with the seam.

The molten solder 44 within the tank 43 is maintained under pressure of an inert, noncombustible gas, such as nitrogen gas which is introduced into the top of the tank by a pipe 45. The pipe leads from a conventional pressure regulator 46 receiving the gas from a pipe 47 which leads from any suitable supply of the gas. The regulator may be manually operated to control the pressure of the gas on the solder in the tank 43 so that the gas will force the solder through the supply pipe 42 and feed channels 34, 36 in the stationary element 22 under a predetermined pressure determined by the force required to lay or gently deposit the solder onto the side seams of the bodies as hereinbefore mentioned.

In order to maintain the solder in a molten condition while passing through the supply pipe 42 and feed channels 34, 36 provision is made for heating these parts. The supply pipe 42 is heated preferably by the well known method of electric resistance heating in which the terminal ends of the pipe are connected by wires 51, 52 (Fig. 1) to a controllable source 53 of electric current. A rheostat or other suitable control switch 54 is provided in the wire 51 to control the current passing through the circuit, which includes the wires 51, 52 and the pipe 42. The resistance of the pipe creates heat in the pipe and thereby maintains the solder in its molten condition while passing therethrough.

Heating of the solder while passing through the feed channels 34, 36 is effected preferably by a heating element 56 which preferably is embedded in the disc 22 and its stem 31. This heating element extends through the stem 31 adjacent and on both sides of the channel 36, then extends upwardly through the disc 22 adjacent and along both sides of the channel 34 and then extends completely around the remaining portion of the disc adjacent its outer periphery as best shown in Figs. 2 and 3. The terminal ends of the heating element 56 extend out at the outer end of the stem 31 and are connected to any suitable controllable source of electric current such as shown in Fig. 1.

The movable element 23 which applies the molten solder to the side seams A of the can bodies B preferably is a rotatable wheel disposed adjacent and in axial alignment with the stationary disc 22. This wheel is mounted on a short horizontal shaft 61 (Fig. 2) journaled in a bearing 62 formed on the bracket 26. The shaft is continuously rotated in time with the travel of the can bodies B, by an endless chain 63 which operates over a sprocket 64 mounted on the wheel shaft 61 and over a driving sprocket 65 mounted on the conveyor driving shaft 17 (see Fig. 1). This rotation of the wheel shaft 61 rotates the applying wheel at a peripherial speed equal to that of the lineal speed of travel of the can bodies so that the outer periphery of the wheel will roll along the side seams of the moving can bodies without slippage therebetween.

Adjacent its outer periphery, the solder applying wheel 23 is formed with a laterally extending flange 67 (Fig. 2) which projects over the outer periphery of the stationary disc 22 in closely spaced relation thereto. This flange occupies the space between the outer periphery of the stationary disc 22 and the path of travel of the side seams of the moving can bodies and its outer periphery preferably engages and rolls along the seams as they pass by although a slight space of a few thousandths of an inch may be allowed between the body and the wheel if desired. For this purpose the sides of the flange are tapered outwardly and inwardly so as to provide a narrow can body or seam engaging surface. This surface of the applying wheel adjacent the path of travel of the bodies extends up through an opening 68 formed in the casing 24.

The outer periphery of the applying wheel 23 preferably is spaced off or divided into sections of a length equal to the length of a can body as best shown in Fig. 3. It is only these surfaces that travel adjacent the can bodies. Between the ends of the sections, the wheel is formed with clearance recesses 69 which are equal in length to the spaces between the moving bodies. The flange 67 of the wheel along each of these can body sections is pierced by a plurality of radially disposed and closely spaced small diameter apertures or short delivery channels or outlets 71 (Figs. 3 and 4) arranged in a straight line around the wheel. The outer ends of these channels terminate in a shallow annular groove 72 formed in the outer periphery of the wheel and substantially equal in width to the diameter of the channels. The inner ends of the channels are slightly tapered and thus terminate in a slightly larger diameter disposed adjacent the outer periphery of the stationary disc 22. The delivery channels 71 disposed adjacent the ends of the can body sections of the wheel 23 are spaced closer together and are larger in diameter for applying a greater quantity of solder at the ends of the can body seams than that applied to the seam intermediate its ends. Such channels may also be located anywhere along the body sections to effect an increase or decrease in the solder applied to any predetermined place on the can seam.

Hence as the applying wheel 23 rotates around the stationary disc 22, the inner enlarged ends of the delivery channels 71 pass by and momentarily come into communication with the outer end of the stationary feed channel 34. While a delivery channel 71 is in communication with the feed channel 34, there is a direct passageway between the feed channel and the delivery channel. Hence the molten solder under pressure in the feed channel 34 flows up through the delivery channel 71 in the wheel and forms at its outer end a small drop or globule or pellet C of solder as best shown in Fig. 4. The pressure on the solder is only sufficient to force the solder up into the delivery channels and form the small globule or drop on their outer ends. The counterbore 35 in the outer end of the feed channel 34 preferably is just large enough to permit two or three delivery channels 71 to be in communication simultaneously with the feed channel.

While the delivery channels 71 remain in communication with the feed channel 34, the drop or globule C of solder increases in size, and when the delivery channels are spaced closely together, these globules run together by capillary attraction and thus form in the peripheral groove 72 an undulated or a uniformly thick wire form band of solder, depending upon the spacing of the delivery channels.

Thus as the applying wheel 23 rolls adjacent the side seam A of a can body B moving in time with the wheel, the molten solder globules C, as they are formed on the ends of the delivery channels 71 successively as the channels pass the feed channel 34, are laid or gently deposited onto the seam to apply thereto a narrow continuous band or ribbon of solder which may be of a uniform thickness, or as when the delivery channels 71 are spaced closer or farther apart as explained above, the thickness may be varied along different places of the seam. This application of solder to the seam is effected in an air free atmosphere brought about by the escape of or the presence of the inert gas in the opening 68 of the gas filled casing 24. Thus the solder is prevented from oxidation.

When the entire length of the side seam of the body is soldered, the flow of solder from the feed channel 34 is cut off by the passage of the blank section adjacent the wheel recesses 69, over the feed channel. This prevents solder globules from being formed on the wheel as the space between the bodies is passing over the wheel. There will be no overflow of solder from the delivery channels 71 since the solder is confined in the peripheral groove 72 while it is applied to the seam. However provision is made for any overflow that may leak out between the inner surface of the flange 67 of the applying wheel 23 and the outer periphery of the stationary disc 22. This overflow of solder is held to a minimum by the close fit between these parts.

Any overflow of solder falls to the bottom of the gas filled casing 24 and drains out into a drain pipe 75 (Fig. 1) which is connected to the casing. The opposite end of the pipe connects with a conventional pump 76 which may be operated in any suitable manner such as shown in the drawings. This pump forces the overflow solder, through a return pipe 77 and check valve 78, into the supply tank 43 for re-use. Thus the molten solder is maintained in a closed system, from which all air is excluded, toward the end that oxidation of the solder and the formation of dross is prevented.

If spot soldering or coating is desired instead of continuous coating as described above, the spacing of the delivery channels 71 in the applying wheel 23 may be increased to bring about separate spaced application of the solder or coating material by the wheel. In such a wheel, a series of separated and spaced spots of solder or coating material may be readily applied to an article.

It is thought that the invention and many of its attendent advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. In an apparatus for applying fluid materials to a predetermined area on articles, the combination of means for propelling articles in spaced and timed order along a predetermined path of travel, a housing having an opening, said opening being disposed adjacent said path of travel of the articles, a stationary feed disc disposed in said housing, said disc having a fluid feeding channel formed therein and communicating at one end with a closed source of fluid material under pressure and terminating at its opposite end at the periphery of the disc adjacent said housing opening, a rotatable applying wheel surrounding the periphery of said feed disc and having a plurality of radially disposed delivery channels formed therein and communicable in succession with said stationary feed channel for forming spaced globules of the fluid material on the periphery of said applying wheel, actuating means for rotating said applying wheel in time with the advancement of said articles for applying said globules to said articles through the opening in said housing, and means for forcing an inert gas into said housing and through its opening to protect the fluid material against deterioration.

2. In an apparatus for applying fluid materials to a predetermined area on articles, the combination of means for propelling articles in spaced and timed order along a predetermined path of travel, a housing having an opening, said opening being disposed adjacent said path of travel of the articles, a stationary feed disc disposed in said housing, said disc having a fluid feeding channel formed therein and communicating at one end with a closed source of fluid material under pressure and terminating at its opposite end at the periphery of the disc adjacent said housing opening, a rotatable applying wheel surrounding the periphery of said feed disc and having a plurality of radially disposed delivery channels formed therein and communicable in succession with said stationary feed channel for forming spaced globules of the fluid material on the periphery of said applying wheel, actuating means for rotating said applying wheel in time with the advancement of said articles for applying said globules to said articles through the opening in said housing, a closed tank connecting with said feed channel and containing a supply of the fluid material under pressure, means for regulating said pressure, and means for draining excess fluid material from said housing and for returning it to said tank for re-use.

3. In an apparatus for applying fluid materials to a predetermined area on articles, the combination of means for propelling articles in spaced and timed order along a predetermined path of travel, a housing having an opening, said opening being disposed adjacent said path of travel of the articles, a stationary feed disc disposed in said housing, said disc having a fluid feeding channel formed therein and communicating at one end with a closed source of fluid material under pressure and terminating at its opposite end at the periphery of the disc adjacent said housing opening, a rotatable applying wheel surrounding the periphery of said feed disc and having a plurality of spaced groups of radially disposed delivery channels formed therein and communicable in succession with said stationary feed channel for forming spaced globules of the fluid material on the periphery of said applying wheel, actuating means for rotating said applying wheel in time with the advancement of said articles for applying said globules to said articles through the opening in said housing, and a heating element located in said stationary feed disc adjacent its outer periphery and adjacent its feed channel for heating the fluid material in said disc and in said applying wheel.

4. In an apparatus for applying fluid materials to a predetermined area on articles, the combination of means for propelling articles in spaced and timed order along a predetermined path of travel, a housing having an opening, said opening being disposed adjacent said path of travel of the articles, a stationary feed disc disposed in said housing, said disc having a fluid feeding channel formed therein and communicating at one end with a closed source of fluid material under pressure and terminating at its opposite end at the periphery of the disc adjacent said housing opening, a rotatable applying wheel surrounding the periphery of said feed disc and having a plurality of radially disposed delivery channels formed therein and communicable in succession with said stationary feed channel for forming measured portions of the fluid material on the periphery of said applying wheel, actuating means for rotating said applying wheel in time with the advancement of said articles for applying said measured portions to said articles through the opening in said housing.

5. In an apparatus for soldering seams of can bodies or other articles, the combination of means for supporting a column of molten solder, means for feeding said solder toward a terminal end of said column under a suitably controlled substantially constant pressure, dividing means movable relative to said column-supporting means for dividing solder at the terminal end of said column into a plurality of measured globules of solder and for carrying said globules in spaced order on a surface of said dividing means, and means for moving said dividing means relative to the terminal end of said column of solder and toward the seam of an article to be soldered to carry said globules on said surface of the dividing means into contact with said seam for directly depositing said globules in spaced order onto said seam for bonding the parts of the seam together.

6. In an apparatus for applying liquid material to a predetermined area on articles, the combination of an article support, a source of liquid material, a feed element having a feed channel formed therein and in communication with said source of liquid material, a movable applying element disposed adjacent said feed element and adjacent said support, said element having a plurality of variably spaced delivery outlets formed therethrough and registrable successively with said feed channel, means for forcing said liquid from said source to and through said feed channel and said delivery outlets under substantially constant pressure, means for moving said applying element relative to said feed element for registering said delivery outlets successively with said feed channel for receiving the liquid material therefrom and forming and holding a globule of the material at the terminal portion of each of said outlets, and means for advancing articles upon said support past and in unison with said applying element and in contact with said globules at the outlets of said moving applying element for transferring said globules onto the article in the varied spaced order of said outlets, thereby applying to predetermined portions of the article a greater amount of the liquid material than to other portions.

RONALD E. J. NORDQUIST.

REFERENCES CITED

The following references are of record in the file of this patent:

UNITED STATES PATENTS

| Number | Name | Date |
|---|---|---|
| 676,711 | Barnay | June 18, 1901 |
| 754,939 | Rehfuss | Mar. 15, 1904 |
| 842,926 | Walsh | Feb. 5, 1907 |
| 993,195 | Phelps | May 23, 1911 |
| 1,172,906 | Robinson | Feb. 22, 1916 |
| 1,318,871 | Heine | Oct. 14, 1919 |
| 1,331,558 | Bunch | Feb. 24, 1920 |
| 1,341,447 | Timm | May 25, 1920 |
| 1,543,235 | Scheminger | June 23, 1925 |
| 1,833,497 | Prouty | Nov. 24, 1931 |
| 1,956,344 | Coyle | Apr. 24, 1934 |
| 2,063,048 | Norris | Dec. 8, 1936 |
| 2,199,265 | Lohrey | Apr. 30, 1940 |
| 2,262,884 | Compton | Nov. 18, 1941 |
| 2,438,721 | Spencer | Mar. 30, 1948 |